United States Patent
Shinohara et al.

(10) Patent No.: US 9,194,992 B2
(45) Date of Patent: Nov. 24, 2015

(54) LIGHT GUIDE PLATE AND SURFACE LIGHT SOURCE DEVICE

(71) Applicant: OMRON Corporation, Kyoto-shi, Kyoto (JP)

(72) Inventors: Masayuki Shinohara, Nagaokakyou (JP); Kazuhide Hirota, Moriyama (JP); Takako Ishikawa, Kobe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/138,975

(22) Filed: Dec. 23, 2013

(65) Prior Publication Data

US 2014/0176875 A1 Jun. 26, 2014

(30) Foreign Application Priority Data

Dec. 26, 2012 (JP) ................. 2012-283655

(51) Int. Cl.
 *G02F 1/1335* (2006.01)
 *F21V 8/00* (2006.01)
(52) U.S. Cl.
 CPC .............. *G02B 6/0016* (2013.01); *G02B 6/002* (2013.01); *G02B 6/0038* (2013.01)
(58) Field of Classification Search
 CPC ............ G02F 1/133615; G02B 6/0038; G02B 6/0028; G02B 6/0045; G02B 6/0046; G02B 6/0048

USPC ............................................. 349/65; 362/615
See application file for complete search history.

(56) References Cited

U.S. PATENT DOCUMENTS

| | | | | |
|---|---|---|---|---|
| 2007/0064440 | A1* | 3/2007 | Liao | 362/600 |
| 2007/0177486 | A1* | 8/2007 | Naoi | 369/112.19 |
| 2007/0274100 | A1* | 11/2007 | Yang et al. | 362/615 |
| 2011/0176089 | A1* | 7/2011 | Ishikawa et al. | 349/65 |
| 2011/0304784 | A1* | 12/2011 | Hirota et al. | 349/15 |

FOREIGN PATENT DOCUMENTS

| | | |
|---|---|---|
| JP | 2008-016432 A | 1/2008 |
| JP | 2012-059419 A | 3/2012 |

* cited by examiner

*Primary Examiner* — Thanh-Nhan P Nguyen
(74) *Attorney, Agent, or Firm* — Osha Liang LLP (57) ABSTRACT

A light guide plate has a light introducing portion configured to confine light that is incident from an end surface, and a light guide-plate main body configured to emit incident light to an outside from a light emitting surface and provided continuously with the light introducing portion in a thickness smaller than a maximum thickness of the light introducing portion. The light introducing portion has an inclined surface inclined toward the light guide-plate main body from a surface having a larger thickness than a thickness of the light guide-plate main body, on at least one of a surface at a light emission side and a surface opposite to the surface at the light emission side.

8 Claims, 10 Drawing Sheets

LIGHT GUIDE PLATE AND SURFACE LIGHT SOURCE DEVICE

CROSS REFERENCE TO RELATED APPLICATIONS

This application claims priority to Japanese Patent Application No. 2012-283655 filed on Dec. 26, 2012, the entire contents of which are incorporated by reference herein.

BACKGROUND

1. Technical

The present invention relates to a light guide plate and a surface light source device, and specifically relates to a light guide plate, a surface light source device.

2. Related Art

In recent years, with a reduction in a thickness of a mobile device that has a surface light source device, a reduction in the thickness of the surface light source device is also being required. To reduce the thickness of the surface light source device, it becomes necessary to reduce a thickness of a light guide plate. However, even when the thickness of a planar light guide plate can be reduced, there is a limit to a reduction in a height of a light source composed by an LED. Therefore, when a thin planar light guide plate is used, the height of the light source becomes larger than a thickness of an end surface (a light-incident end surface) of the light guide plate, and the light source arranged opposite to the light-incident end surface of the light guide plate is protruded to above an upper surface of the light guide plate. When the light source is protruded to above the light guide plate, not all the light emitted from the light source is incident to the light-incident end surface, but a part of the light leaks to an outside, and light utilization efficiency becomes poor.

Figure 1:
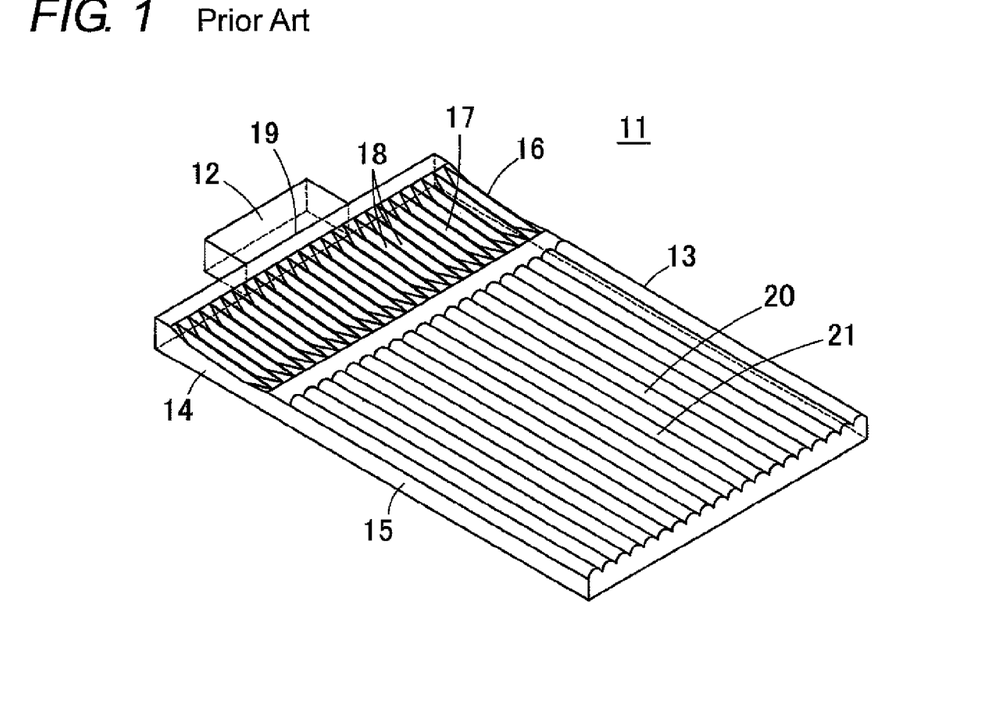
FIG. 1 is a perspective view of a conventional surface light source device.

FIG. 1 is a perspective view schematically illustrating a conventional surface light source device. A surface light source device 11 in FIG. 1 is configured by a light source 12 and a light guide plate 13, and the light source 12 is arranged opposite to a light-incident end surface 19 of the light guide plate 13. The light guide plate 13 is provided by integrally forming a light guide-plate main body 15 that has substantially a uniform thickness and a light introducing portion 14 that has a wedge shape. An inclined surface 16 is formed on an upper surface of the light introducing portion 14, and a directional transform pattern 17 (light-leakage prevention patterns) formed of a plurality of V-grooves 18 is formed on the inclined surface 16. A thickness of an end surface (the light-incident end surface 19) of the light introducing portion 14 is larger than a height of the light source 12. As a surface light source device that uses a light guide plate having such a structure, there is a one disclosed in Japanese Unexamined Patent Publication No. 2008-16432, for example.

In the surface light source device 11, light emitted from the light source 12 is incident from the light-incident end surface 19 into the light introducing portion 14. Since the thickness of the end surface (the light-incident end surface 19) of the light introducing portion 14 is larger than the height of the light source 12, the light emitted from the light source 12 is efficiently taken into the light introducing portion 14. The light incident to the light introducing portion 14 is reflected by the upper surface (the inclined surface 16) or a lower surface of the light introducing portion 14, and is guided to the light guide-plate main body 15. When the light is emitted from a light emitting surface 20 of the light guide-plate main body 15, a directional characteristic is spread in a width direction by lenticular lenses 21.

In this case, when the inclined surface 16 is flat, there is a risk that a part of the light that is incident to the light introducing portion 14 leaks to an outside by being transmitted through the inclined surface 16, without being reflected by the inclined surface 16. Therefore, in the surface light source device 11, light leakage from the inclined surface 16 is reduced, by providing the directional transform pattern 17 on the inclined surface 16. That is, in the surface light source device 11, since the V-grooves 18 are provided on the inclined surface 16, an incidence angle of the light incident to the V-grooves 18 becomes large, light is totally reflected by the V-grooves 18, and light L is hard to leak from the inclined surface 16. As a result, in the surface light source device 11 in such a structure, it becomes possible to improve light utilization efficiency and reduce the thickness of the surface light source device.

However, in the surface light source device 11, since the light incident to a groove-inclined surface of the V-grooves 18 is totally reflected to a lateral direction relative to an incident direction, light that is guided to outward inclined directions increases, viewed from the light source 12. Therefore, emission lines are generated in outward inclined directions, viewed from the light source 12. When such emission lines are generated, the surface light source device 11 glitters brightly when the surface light source device 11 is looked at from inclined directions, and visibility becomes poor.

Figure 2:
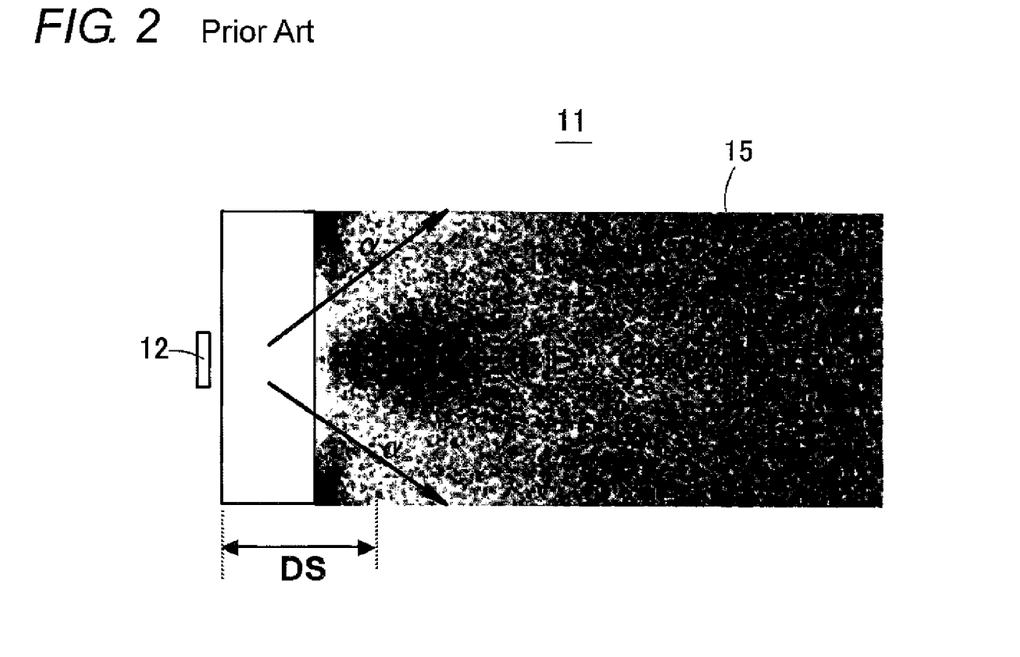
FIG. 2 is a simulation view of a state that emission lines are generated in outward inclined directions in a sample of the surface light source device in FIG. 1.

FIG. 2 is a simulation view of a state that emission lines a are generated in outward inclined directions in a sample of the surface light source device 11 (however, optical patterns such as deflection patterns are not provided on a lower surface of the light guide plate 13).

SUMMARY

One or more embodiments of the present invention make less noticeable the emission lines that are generated in outward inclined directions, viewed from a light source.

A light guide plate according to one or more embodiments of the present invention includes a light introducing portion configured to confine light that is incident from an end surface, and a light guide-plate main body configured to make incident light emit from a light emitting surface to an outside and provided continuously with the light introducing portion in a thickness smaller than a maximum thickness of the light introducing portion. The light introducing portion has an inclined surface that is inclined toward the light guide-plate main body from a surface having a larger thickness than a thickness of the light guide-plate main body, on at least one of a surface at a light emission side and a surface opposite to the surface at the light emission side. The light guide-plate main body has a directional transform pattern formed of stripe-shaped pattern elements on at least one of the surface at the light emission side and the surface opposite to the surface at the light emission side. Viewed from a side surface, light reflecting portions are provided in a region positioned from the light introducing portion to a portion adjacent to the light introducing portion of the light guide-plate main body.

In the light guide plate that is provided with a directional transform portion formed of stripe-shaped pattern elements, emission lines in outward inclined directions are easily generated by light guided to outward inclined directions, due to reflection of the light by the pattern elements. However, in a light guide plate according to one or more embodiments of the present invention, since the light reflecting portions are provided in a region positioned from the light introducing portion to a portion adjacent to the light introducing portion of the light guide-plate main body viewed from the side surface of the light guide plate, a part of the light reflected by the pattern elements and guided to outward inclined directions can be returned to the inside of the light guide plate by reflecting the light at the light reflecting portions. Since the emission lines can be made not easily noticeable by increasing the number of emission lines, the number of emission lines generated in outward directions can be decreased. As a result, a brightness distribution in a region near the light introducing portion of the light guide-plate main body can be made uniform, and a dead space of the light guide plate can be made small.

The light reflecting portions may be holes that are formed between a front surface and a rear surface of the light guide plate such as through-holes, for example. The light reflecting portions may be slit-shaped holes extending to a direction perpendicular to the end surface.

A surface light source device according to one or more embodiments of the present invention includes a light guide plate according to one or more embodiments of the present invention, and a light source configure to transmit light to the end surface of the light introducing portion of the light guide plate. In a surface light source device according to one or more embodiments of the present invention, since a light guide plate according to one or more embodiments of the present invention is used, emission lines generated in outward inclined directions can be reduced.

A light guide plate according to one or more embodiments of the present invention can be used for a liquid-crystal display device. When this light guide plate is used for the liquid-crystal display device, emission lines in inclined directions are not easily generated on the screen of the liquid-crystal display device.

A surface light source device according to one or more embodiments of the present invention can be also used in a mobile device such as a smartphone, a tablet computer, an electronic book reader, and an electronic dictionary.

Embodiments of the present invention may be combinations of above configuration elements, and such combinations are within the scope of the present invention.

DETAILED DESCRIPTION

Embodiments of the present invention are described below with reference to the attached drawings. However, the present invention is not limited to the following embodiments, and can be variously modified within a range not deviating from the scope of the present invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 3A:
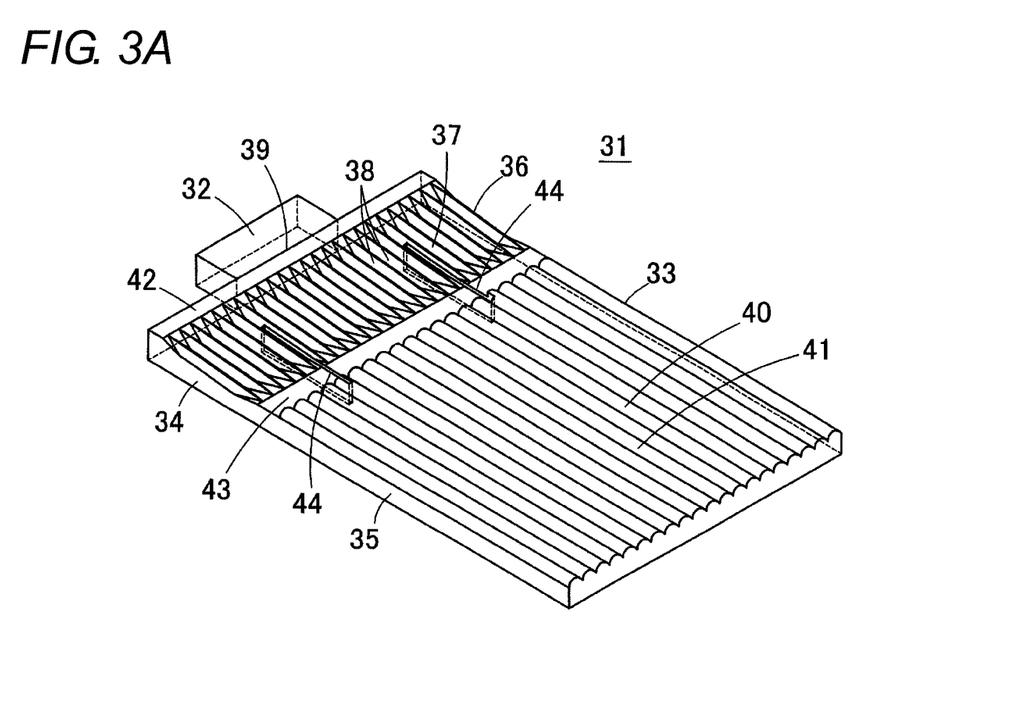
FIG. 3A is a perspective view of a surface light source device according to a first embodiment of the present invention.
Figure 3B:
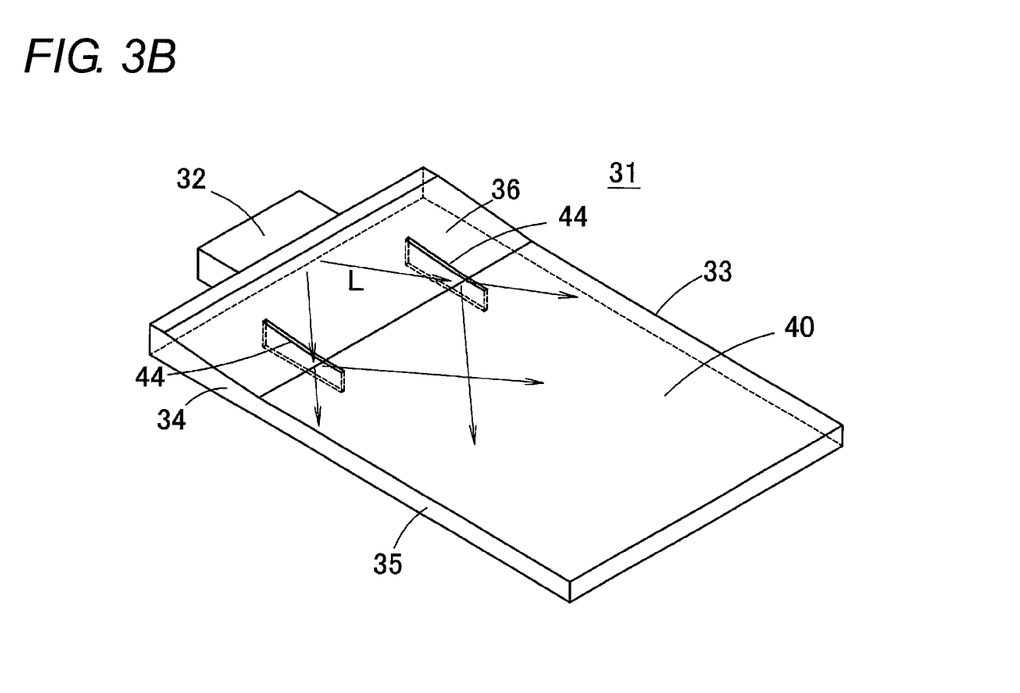
FIG. 3B is a schematic view of behaviors of light in the surface light source device in FIG. 3A.

A structure of a surface light source device according to a first embodiment of the present invention is described with reference to FIGS. 3A and 3B. FIG. 3A is a perspective view of a surface light source device 31 according to the first embodiment of the present invention. FIG. 3B is a schematic perspective view of behaviors of light in the surface light source device 31.

The surface light source device 31 is formed of a light source 32 and a light guide plate 33. The light source 32 incorporates one or a plurality of LEDs, and emits white light from a light emission window at a front side. This light source 32 is also referred to as a point light source.

The light guide plate 33 has a light introducing portion 34 provided at an end part of a light guide-plate main body 35. The light guide plate 33 is formed of a transparent resin having a high refractive index such as an acrylic resin, a polycarbonate resin (PC), cycloolefin resin, and polymethylmethacrylate (PMMA).

The light introducing portion 34 has a wedge shape, and a thickness becomes gradually smaller toward a light guide-plate main body side. That is, in an upper surface of the light introducing portion 34, an end part of a light-incident end surface side is a horizontal surface 42, and an inclined surface 36 is formed from an end of the horizontal surface 42 toward an end of the light guide-plate main body 35. The inclined surface 36 extends in a band shape from one side surface to the other end surface of the light guide plate 33, and is inclined downward from the end of the horizontal surface 42 toward the end of the light guide-plate main body 35.

A directional transform pattern 37 is formed on the inclined surface 36. The directional transform pattern 37 is configured by a plurality of pattern elements 38 having V-groove shapes. The pattern elements 38 extends in a direction perpendicular to a light-incident end surface 39 (hereinafter, referred to as a light axis direction), viewed from a vertically upper direction (a direction perpendicular to a light emitting surface 40), and are aligned in a width direction of the inclined surface 36 so as to be parallel with each other.

A front surface and a rear surface of the light guide-plate main body 35 are parallel and are in planar shapes. The light guide-plate main body 35 has substantially a uniform thickness, and the thickness of the light guide-plate main body 35 is smaller than a maximum thickness of the light introducing portion 34. The light guide-plate main body 35 occupies a major portion of the light guide plate 33. On a surface opposite to the light emitting surface 40 of the light guide-plate main body 35, light emitting units 45 are formed in a prism-shaped pattern, by sandblasting, spreading ink, in a diffraction grating pattern, and the like (see FIG. 11).

A narrow portion adjacent to the light introducing portion 34 of the upper surface of the light guide-plate main body 35 becomes a flat surface 43, and a portion excluding the flat surface 43 becomes the light emitting surface 40. On the light emitting surface 40, there are provided lenticular lenses 41 for spreading, in a width direction, a directional characteristic of light emitted from the light emitting surface 40. The lenticular lenses 41 extend in the light axis direction, and are aligned along a width direction of the light emitting surface 40. The flat surface 43 may not be provided.

A pair of slit-shaped light reflecting portions 44 extending in the light axis direction are provided on the light guide plate 33. The light reflecting portions 44 are holes (hollows) pierced from an upper surface to a lower surface of the light guide plate 33. The light reflecting portions 44 extend from a region in which the directional transform pattern 37 of the light introducing portion 34 is provided to a region in which the lenticular lenses 41 of the light guide-plate main body 35 are provided. According to one or more embodiments of the present invention, the light reflecting portions 44 do not enter a valid illumination region that is used to illuminate a liquid crystal panel and the like by uniformly emitting light.

In the surface light source device 31, light emitted from the light source 32 is incident from the light-incident end surface 39 into the light introducing portion 34 and is reflected by the upper surface and the lower surface of the light introducing portion 34, or passes through the light introducing portion 34 and is guided to the light guide-plate main body 35 having a small thickness. The light guided to the light guide-plate main body 35 is guided in the light guide-plate main body 35 by being reflected by the upper surface and the lower surface of the light guide-plate main body 35. The light incident to the light emitting units 45 in the middle of the light guidance is reflected by the light emitting units 45 and is emitted from the light emitting surface 40, and makes the light emitting surface 40 emit light uniformly.

The light incident to the inclined surface 36 in the light introducing portion 34 is totally reflected by a groove-inclined surface of the directional transform pattern 37. Consequently, an incidence angle of the light incident to the upper surface of the light guide plate 33 after being reflected by the lower surface of the light introducing portion 34 becomes large, and the light does not easily leak from the light guide plate 33. However, since the light that is totally reflected by the groove-inclined surface of the directional transform pattern 37 is bent to a lateral direction relative to the incident direction viewed from a vertically upper direction, the light is guided to inclined directions viewed from the light source 32. Therefore, in the conventional surface light source device, an emission line a in an outward inclined direction is generated (see FIG. 2).

On the other hand, in the surface light source device 31, since the light reflecting portions 44 are provided in the light guide plate 33, the light L guided in the outward inclined directions is reflected by the light reflecting portions 44 and is returned to the inside of the light guide plate 33, as shown in FIG. 3B. As a result, new emission lines are generated and the number of emission lines increases, and accordingly outward inclined emission lines can be made not easily noticeable.

Figure 4:
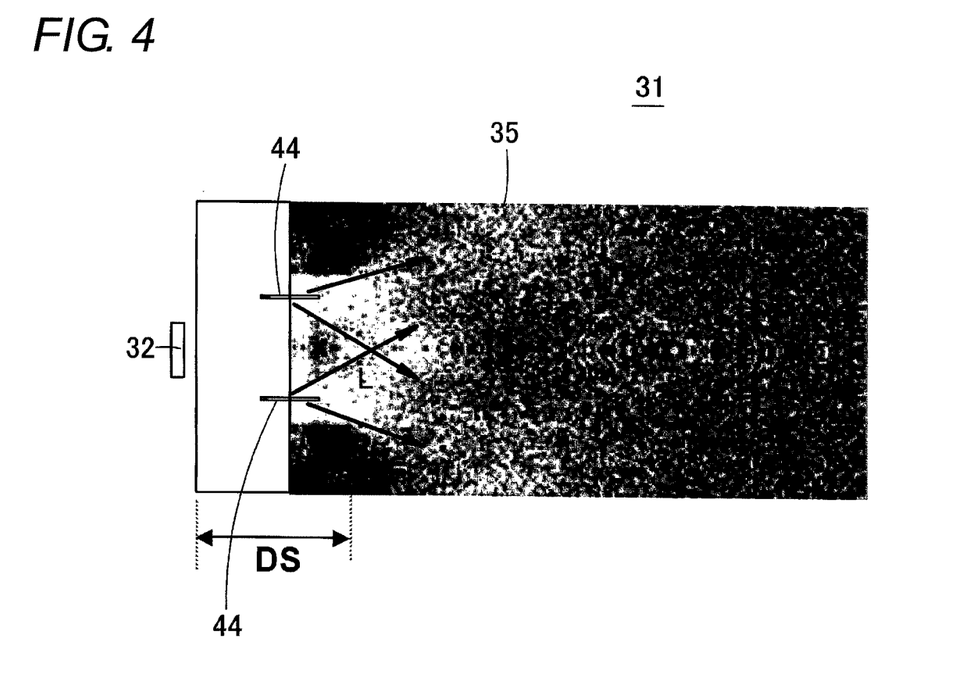
FIG. 4 is a simulation view of a brightness distribution of a sample of the surface light source device in FIG. 3A.
Figures 6A, 6B:
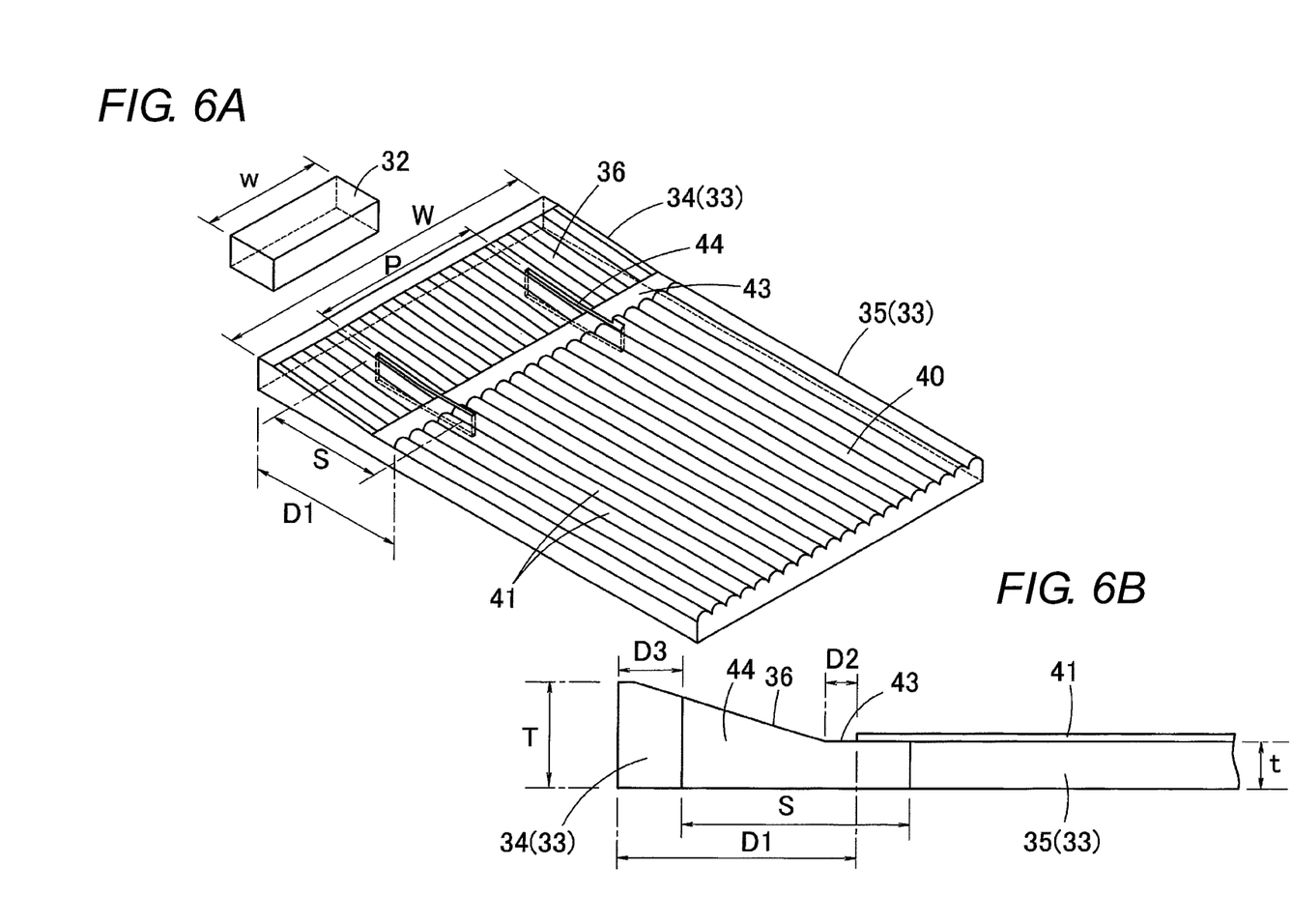
FIG. 6A is a schematic perspective view of dimensions of the sample used in FIG. 4.
FIG. 6B is a partially-broken-down schematic cross-sectional view of the sample in FIG. 6A.

FIG. 4 shows a brightness distribution of the surface of the light guide plate of the surface light source device according to the first embodiment of the present invention. The brightness distribution is obtained by simulation by assuming a sample as shown in FIG. 6. Data of the sample of the surface light source device shown in FIG. 6 are as follows.

A width w of a light emission window of the light source 32: 2.4 mm

A width W of the light guide plate 33: 5.1 mm

A maximum width T of the light introducing portion 34: 0.4 mm

A thickness t of the light guide-plate main body 35: 0.23 mm

A distance D1 from the light-incident end surface 39 to the end of the lenticular lens 41: 2.0 mm A distance D2 from the lower end of the inclined surface 36 to the end of the lenticular lens 41: 0.5 mm A length S of the light reflecting portion 44: 2.0 mm A distance D3 from the light-incident end surface 39 to the light reflecting portion 44: 1.0 mm An interval P between the light reflecting portions 44: 3.0 mm A pitch of the lenticular lens 41: 20 μm A curvature radius of the surface of the lenticular lens 41: 75 μm In the sample for the simulation, light emitting units are not provided on the lower surface of the light guide plate 33.

Figure 5:
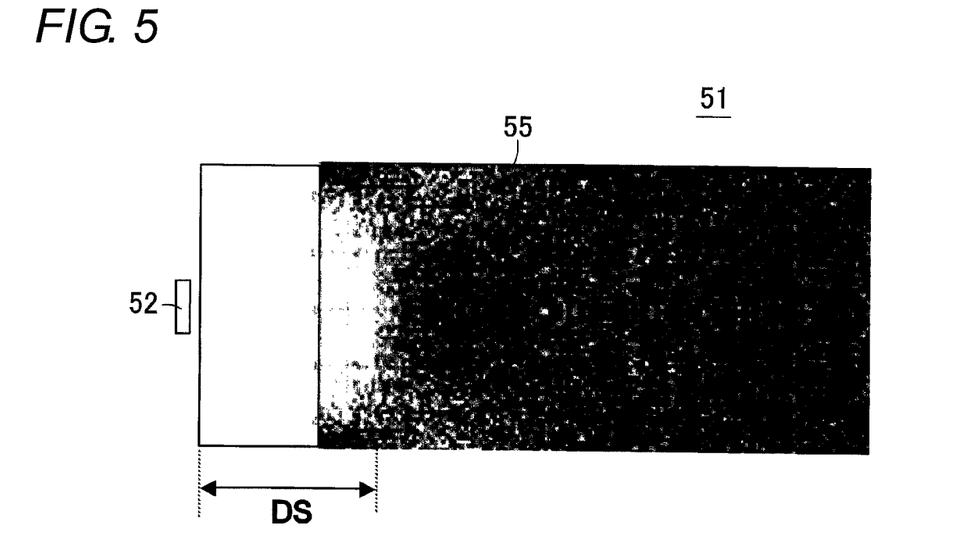
FIG. 5 is a simulation view of a brightness distribution of a surface light source device according to a comparative example.

In the simulation of the conventional example shown in FIG. 2, a sample similar to that in FIG. 6 is used. That is, the light reflecting portions 44 are excluded from the sample in FIG. 6. FIG. 5 shows a sample of a surface light source device 51 (a comparative example). In a region adjacent to a light introducing portion at an end part of a light guide-plate main body 55, there is provided a directional transform pattern (a surface light source device disclosed in Japanese Unexamined Patent Publication No. 2012-59419) in which a directional characteristic of light that is incident to the light guide-plate main body 55 is brought close to the light axis direction. A light source 52 is arranged opposite to a light-incident end surface. For a sample of this comparative example, a sample substantially similar to that in FIG. 6 is used.

When FIGS. 2, 4, and 5 are compared with each other, it becomes clear that emission lines in inclined directions are improved in the sample of the first embodiment in FIG. 4 and in the sample of the comparative example in FIG. 5.

In the sample of the conventional example in FIG. 2, a length DS of a dead space (a region that cannot be used for the light source because of not uniform brightness) is 2.5 mm, and light utilization efficiency is 96.6%. In the sample of the first embodiment in FIG. 4, a length DS of a dead space is 2.5 mm, and light utilization efficiency is 96.3%. In the sample of the comparative example in FIG. 5, a length DS of a dead space is 3.0 mm, and light utilization efficiency is 96.1%. Accordingly, the dead space in the comparative example is longer than that in the conventional example. This is because a region for providing the directional transform pattern in which the directional characteristic is brought closer to the light axis direction is necessary at the end of the light guide-plate main body. On the other hand, the dead space in the first embodiment is not different from that in the conventional example, and becomes shorter than that in the comparative example.

FIGS. 2, 4, and 5 show samples in which light emitting units such as deflection patterns are not provided on the rear surface of the light guide plate. Therefore, in the sample in any one of FIGS. 2, 4, and 5, light is not emitted from the light emitting surface, and the light emitting surface is dark. In the sample of the conventional example in FIG. 2, since the emission lines in inclined directions are present, the length DS of the dead space does not become short even when light emitting units are provided on the lower surface of the light guide plate. On the other hand, in the sample of the first embodiment in FIG. 4, since the emission lines in inclined directions are not easily noticeable, the length DS of the dead space can be made relatively short by providing light emitting units on the rear surface of the light guide plate, and by making uniform the brightness distribution by adjusting distributions of light emitting units. Consequently, in a final product mode, the surface light source device according to the first embodiment of the present invention is also advantageous in the point of the dead space.

(Modification)

Figure 7A:
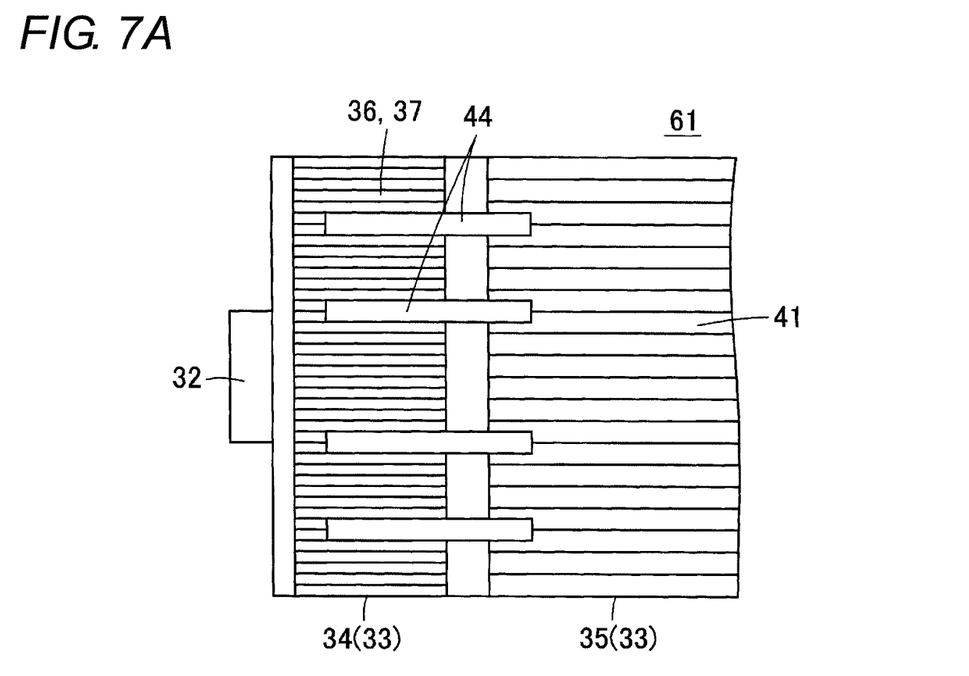
FIGS. 7A and 7B are partially-broken-down plan views of surface light source devices having light reflecting portions of respective different shapes.
Figure 7B:
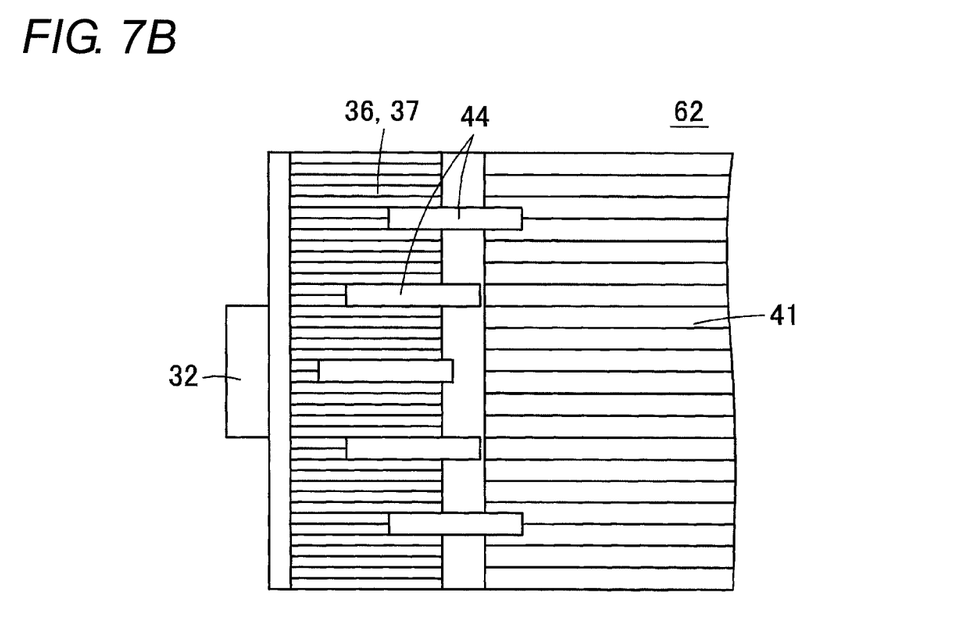

While the slit-shaped light reflecting portions 44 are described in the first embodiment, a layout and shapes of the light reflecting portions 44 can be suitably changed. For example, although two slit-shaped light reflecting portions 44 are provided in the first embodiment, three or more light reflecting portions 44 may be provided as shown in FIG. 7A. Alternatively, as shown in FIG. 7B, each light reflecting portion 44 may be arranged by shifting the light reflecting portion 44 to a direction perpendicular to the light-incident end surface 39.

Figure 8A:
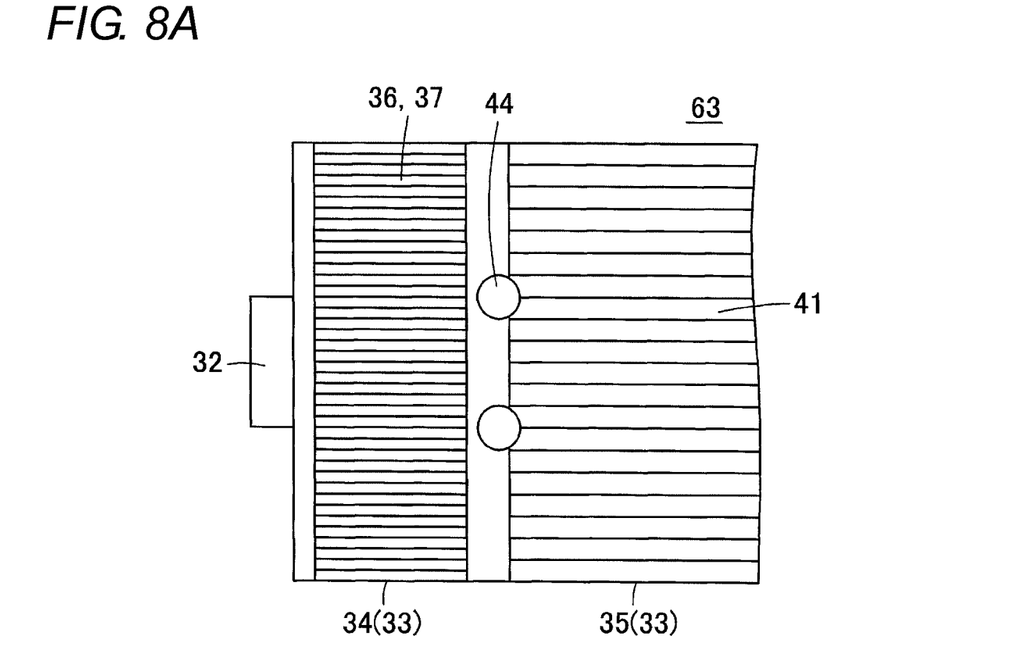
FIGS. 8A and 8B are partially-broken-down plan views of surface light source devices having light reflecting portions of further different shapes.
Figure 8B:
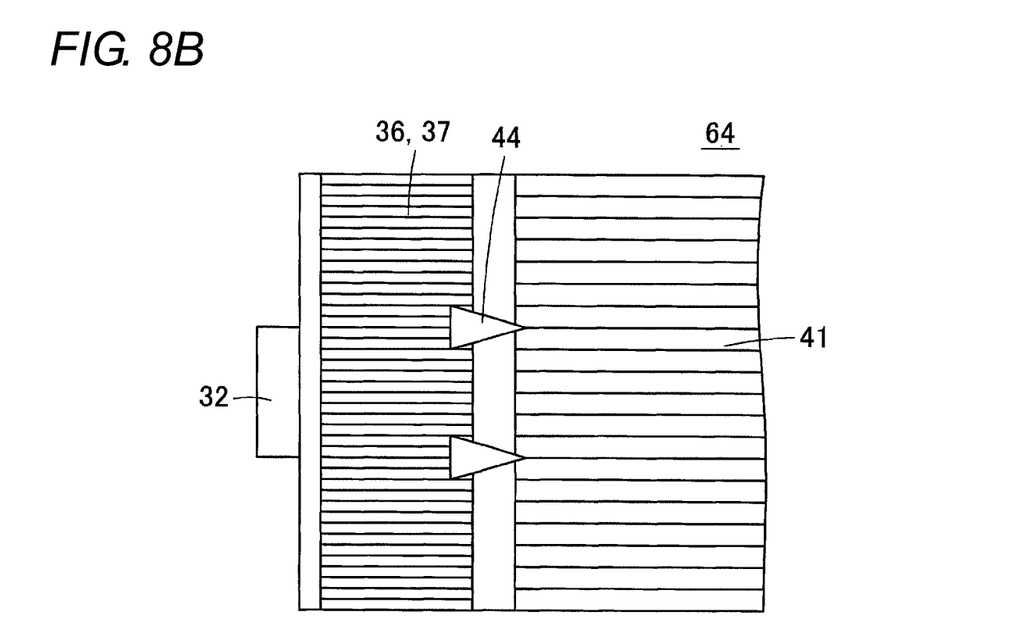
Figure 9A:
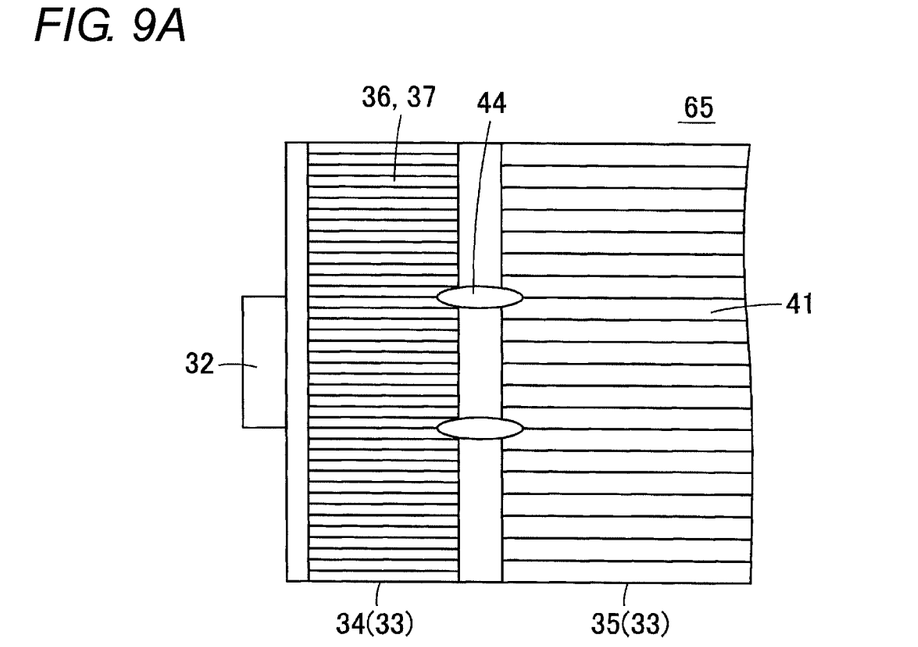
FIGS. 9A and 9B are partially-broken-down plan views of surface light source devices having light reflecting portions of further different shapes.
Figure 9B:
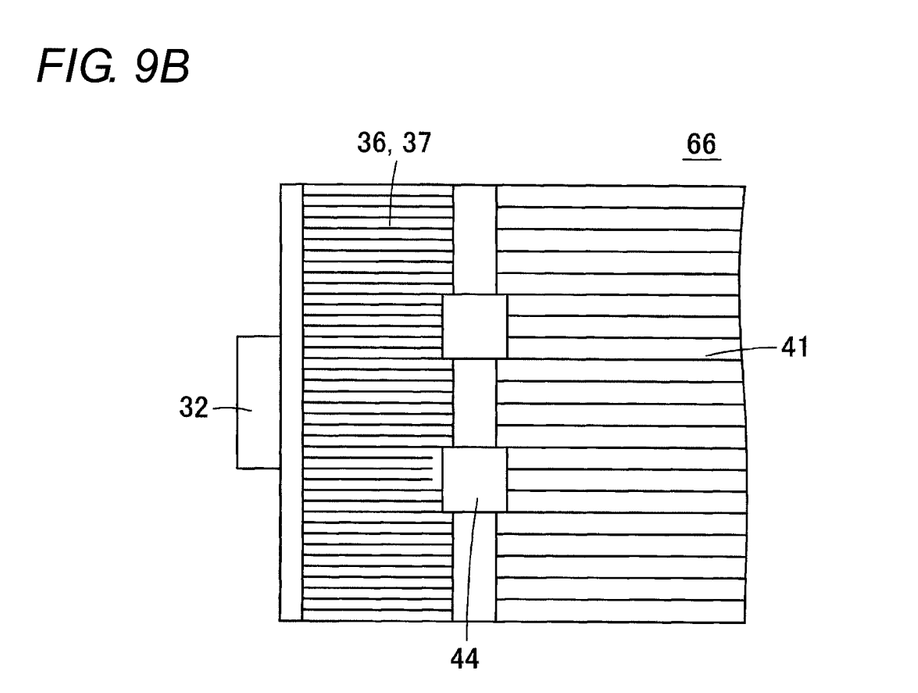

The light reflecting portions 44 may be circular holes as shown in FIG. 8A, triangular holes as shown in FIG. 8B, oblong holes as shown in FIG. 9A, or rectangular holes as shown in FIG. 9B.

The light reflecting portions 44 do not need to protrude through the light guide plate 33, and may be partly continuous.

Second Embodiment

Figure 10:
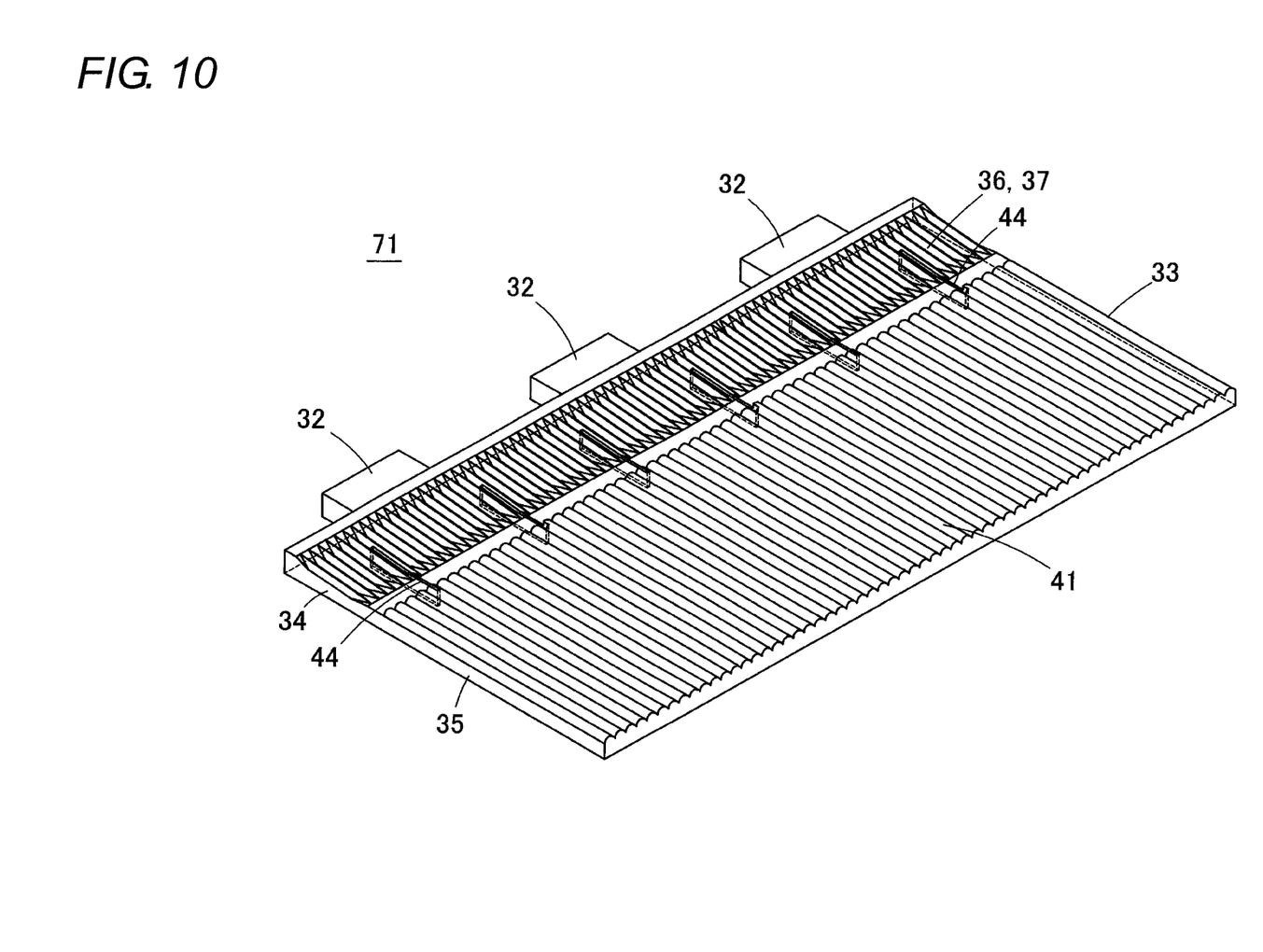
FIG. 10 is a perspective view of a surface light source device according to a second embodiment of the present invention.

FIG. 10 is a perspective view of a surface light source device 71 according to a second embodiment of the present invention. In the surface light source device 71, a plurality of light sources 32 are used for one light guide plate 33. That is, a plurality of light sources 32 are arranged in each constant pitch, opposite to the light-incident end surface 39 of the light guide plate 33. According to such an embodiment, it is possible to manufacture a surface light source device having a large illumination region. A structure of the light guide plate that becomes a basis of the surface light source device 71 may be the light guide plate according to any one of the first embodiment and the modification of the first embodiment.

Third Embodiment

Figure 11:
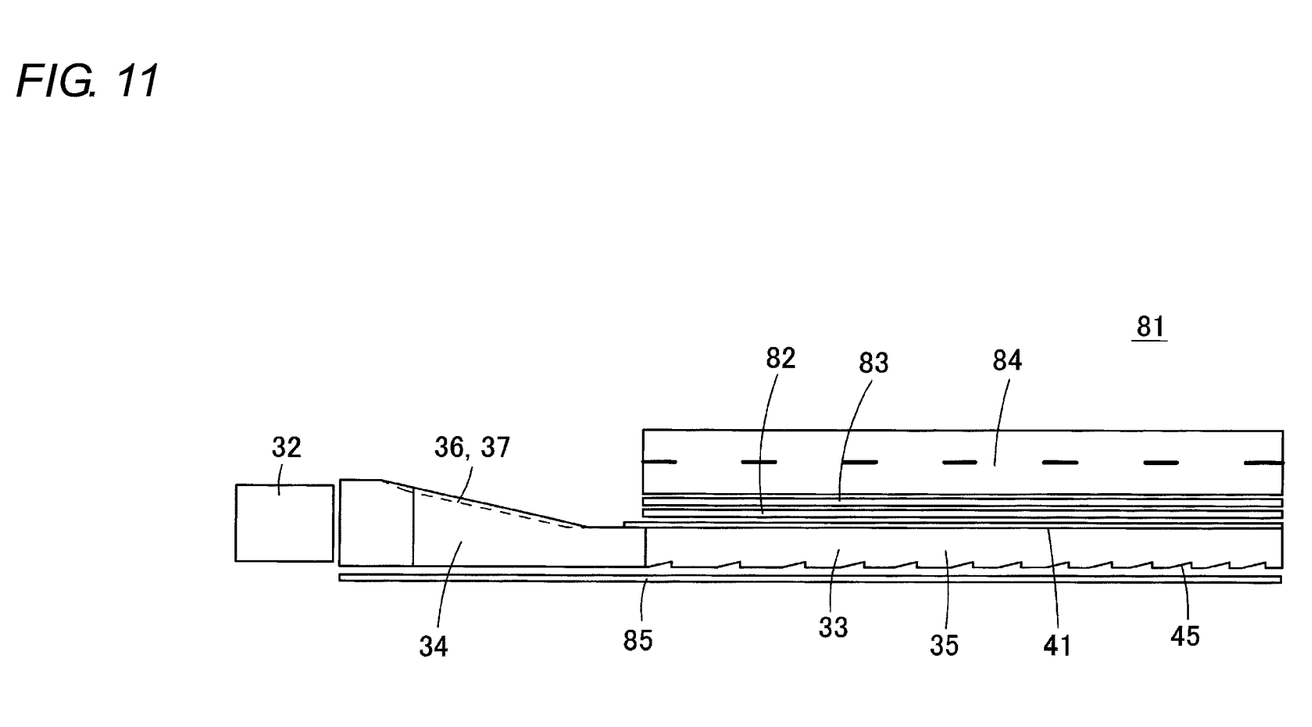
FIG. 11 is a schematic cross-sectional view of a liquid-crystal display device according to one or more embodiments of the present invention.

FIG. 11 is a schematic cross-sectional view of a liquid-crystal display device 81 using the surface light source device (the surface light source device 31 in the first embodiment, for example) according to one or more embodiments of the present invention. The liquid-crystal display device 81 has a diffusion plate 82, a prism sheet 83, and a liquid crystal panel 84 that are superposed opposite to a light-emitting surface side of the light guide plate 33, and a reflection sheet 85 is arranged at a rear side of the light guide plate 33. According to the liquid-crystal display device 81, it is possible to take advantage of a characteristic of the surface light source device of one or more embodiments of the present invention, and an image quality of the liquid-crystal display device 81 can be improved.

Fourth Embodiment

Figure 12:
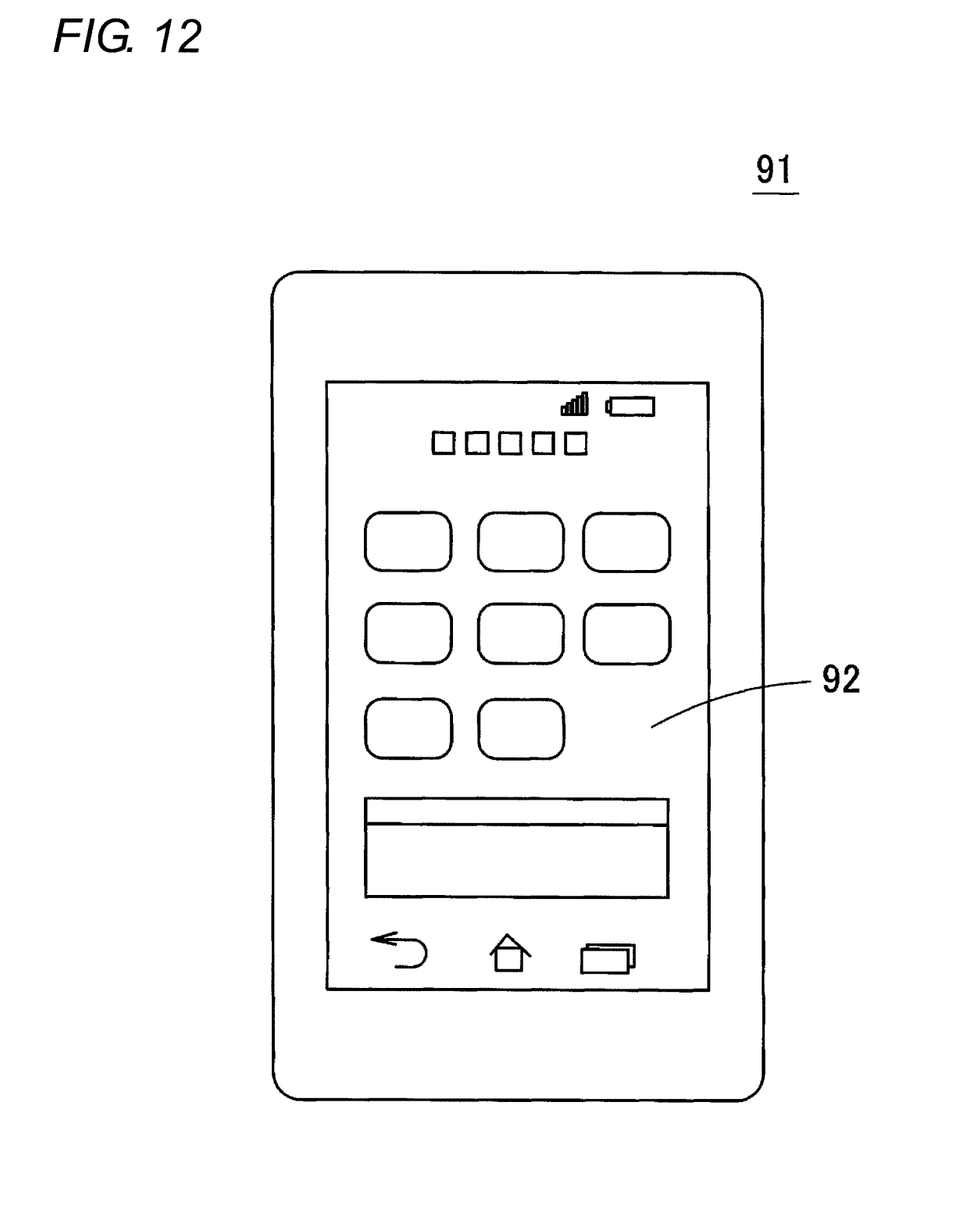
FIG. 12 is a schematic front view of a smartphone according to one or more embodiments of the present invention.

FIG. 12 is a plan view of a mobile device, that is, a smartphone 91 that uses a surface light source device or the liquid-crystal display device of one or more embodiments of the present invention. The smartphone 91 includes a liquid-crystal display device 92 having a touch panel in the front. When a surface light source device of one or more embodiments of the present invention is used for the smartphone 91, the screen does not easily glitter brightly when the surface is looked at from inclined directions, and visibility of the screen improves with a satisfactory image quality. Further, a surface light source device of one or more embodiments of the present invention can be also applied to a mobile device such as a tablet computer, an electronic dictionary, and an electronic book reader, in addition to a portable telephone such as a smartphone.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A light guide plate comprising:
    a light introducing portion configured to confine light that is incident from an end surface; and
    a light guide-plate main body configured to emit incident light to an outside from a light emitting surface and provided continuously with the light introducing portion in a thickness smaller than a maximum thickness of the light introducing portion,
    wherein the light introducing portion comprises an inclined surface inclined toward the light guide-plate main body from a surface comprising a larger thickness than a thickness of the light guide-plate main body, on at least one of a surface at a light emission side and a surface opposite to the surface at the light emission side,
    wherein the light introducing portion comprises a directional transform pattern comprising stripe-shaped pattern elements on at least one of the surface at the light emission side and the surface opposite to the surface at the light emission side, and
    wherein light reflecting portions are provided on the light guide-plate main body in a region from the light introducing portion to a portion adjacent to the light introducing portion when viewed from a side.

2. The light guide plate according to claim 1, wherein the light reflecting portions are holes formed between a front surface and a rear surface.

3. The light guide plate according to claim 2, wherein the light reflecting portions are through-holes.

4. The light guide plate according to claim 1, wherein the light reflecting portions are slit-shaped holes extending to a direction perpendicular to the end surface.

5. A surface light source device comprising:
    the light guide plate according to claim 1; and
    a light source configured to transmit light to the end surface of the light introducing portion of the light guide plate.

6. A liquid-crystal display device comprising:
    the light guide plate according to claim 1;
    a light source configured to emit light to the end surface of the light introducing portion of the light guide plate; and
    a liquid-crystal display panel arranged opposite to the light emitting surface of the light guide plate.

7. A mobile device comprising the liquid-crystal display device according to claim 6.

8. A mobile device comprising:
a liquid-crystal display device comprising:
a light source configured to emit light;
a light guide plate comprising:
   an end face on which light from the light source is incident;
   a light introducing portion configured to confine light that is incident from the end surface; and
   a light guide-plate main body configured to emit incident light to an outside from a light emitting surface and provided continuously with the light introducing portion in a thickness smaller than a maximum thickness of the light introducing portion,
   wherein the light introducing portion comprises an inclined surface inclined toward the light guide-plate main body from a surface comprising a larger thickness than a thickness of the light guide-plate main body, on at least one of a surface at a light emission side and a surface opposite to the surface at the light emission side,
   wherein the light introducing portion comprises a directional transform pattern comprising stripe-shaped pattern elements on at least one of the surface at the light emission side and the surface opposite to the surface at the light emission side, and
   wherein light reflecting portions are provided on the light guide-plate main body in a region from the light introducing portion to a portion adjacent to the light introducing portion when viewed from a side; and
a liquid-crystal display panel arranged opposite to the light emitting surface of the light guide plate.

* * * * *